United States Patent
Li et al.

(10) Patent No.: US 11,137,637 B2
(45) Date of Patent: Oct. 5, 2021

(54) DISPLAY DEVICE WITH LIQUID CRYSTAL PRISM

(71) Applicant: BOE Technology Group Co., Ltd., Beijing (CN)

(72) Inventors: Zhongxiao Li, Beijing (CN); Xue Dong, Beijing (CN); Xiaochuan Chen, Beijing (CN); Wenqing Zhao, Beijing (CN); Haiyan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/882,932

(22) Filed: May 26, 2020

(65) Prior Publication Data

US 2020/0285109 A1    Sep. 10, 2020

Related U.S. Application Data

(63) Continuation of application No. 15/752,345, filed as application No. PCT/CN2017/095410 on Aug. 1, 2017, now abandoned.

(30) Foreign Application Priority Data

Jan. 18, 2017 (CN) .......................... 201710035757.8

(51) Int. Cl.
*G02F 1/1335* (2006.01)
*G02F 1/13357* (2006.01)
(Continued)

(52) U.S. Cl.
CPC .... *G02F 1/133528* (2013.01); *G02F 1/13362* (2013.01); *G02F 1/13439* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 6,433,847 | B1 | 8/2002 | Minoura |
| 8,804,067 | B2 | 8/2014 | Cheng et al. |

(Continued)

FOREIGN PATENT DOCUMENTS

| | | | |
|---|---|---|---|
| CN | 102105833 | A | 6/2011 |
| CN | 102759818 | A | 10/2012 |

(Continued)

OTHER PUBLICATIONS

International Search Report and Written Opinion for International Application No. PCT/CN2017/095410, dated Oct. 26, 2017, 25 pages.

(Continued)

*Primary Examiner* — Lauren Nguyen
(74) *Attorney, Agent, or Firm* — Westman, Champlin & Koehler, P.A.

(57) ABSTRACT

A display device and a display method using the same are disclosed. The display device includes: a display panel including a first substrate, a second substrate and a liquid crystal prism arranged between the first substrate and the second substrate; and a backlight source configured to emit a light which is incident onto the second substrate at an oblique angle; wherein the liquid crystal prism is configured to adjust a deflection angle of the light emitted from the backlight source traveling between the first substrate and the second substrate such that the light emitted from the backlight source is totally-reflected at a light exit face of the display device or exits from the light exit face of the display device.

13 Claims, 3 Drawing Sheets

(51) Int. Cl.
   *G02F 1/1343* (2006.01)
   *G02F 1/29* (2006.01)
   *G02F 1/1333* (2006.01)

(52) U.S. Cl.
   CPC .. *G02F 1/133512* (2013.01); *G02F 1/134309* (2013.01); *G02F 1/29* (2013.01); *G02F 1/133357* (2021.01); *G02F 1/291* (2021.01); *G02F 2203/30* (2013.01)

(56) References Cited

U.S. PATENT DOCUMENTS

| | | | |
|---|---|---|---|
| 10,001,668 | B2 | 6/2018 | Gao et al. |
| 10,197,886 | B2 | 2/2019 | Yang et al. |
| 10,473,944 | B2 | 11/2019 | Yang et al. |
| 2006/0038938 | A1* | 2/2006 | Nakano ............ G02F 1/133512 349/110 |
| 2011/0013123 | A1* | 1/2011 | Park ................. G02B 6/0056 349/96 |
| 2011/0157521 | A1 | 6/2011 | Shimazaki et al. |
| 2012/0280953 | A1 | 11/2012 | Cheng et al. |
| 2013/0307178 | A1 | 11/2013 | Kress |
| 2015/0307178 | A1* | 10/2015 | Fink ................. B64C 1/062 244/119 |
| 2018/0046026 | A1 | 2/2018 | Wang et al. |
| 2018/0046059 | A1 | 2/2018 | Yang et al. |
| 2018/0081208 | A1 | 3/2018 | Zhao et al. |
| 2018/0088344 | A1 | 3/2018 | Yang et al. |
| 2018/0107058 | A1 | 4/2018 | Gao et al. |
| 2019/0094575 | A1 | 3/2019 | Wang et al. |
| 2019/0258110 | A1 | 8/2019 | Li et al. |

FOREIGN PATENT DOCUMENTS

| | | |
|---|---|---|
| CN | 105511179 A | 4/2016 |
| CN | 105511180 A | 4/2016 |
| CN | 105549266 A | 5/2016 |
| CN | 105629491 A | 6/2016 |
| CN | 105652490 A | 6/2016 |
| CN | 106292052 A | 1/2017 |
| CN | 106647003 A | 5/2017 |
| JP | 2008-139684 A | 6/2008 |

OTHER PUBLICATIONS

Office Action, including Search Report, for Chinese Patent Application No. 201710035757.8, dated Feb. 3, 2019, 18 pages.
USPTO-issued prosecution for U.S. Appl. No. 15/752,345, filed Feb. 13, 2018, including: Requirement for Restriction dated Sep. 4, 2019, 8 pages, Non-Final Rejection dated Nov. 15, 2019, 10 pages, and Final Rejection dated Feb. 25, 2020, 10 pages, 28 pages total.

* cited by examiner

DISPLAY DEVICE WITH LIQUID CRYSTAL PRISM

CROSS-REFERENCE TO RELATED APPLICATION(S)

This application is a continuation application of U.S. patent application Ser. No. 15/752,345, filed Feb. 13, 2018, which is U.S. National Stage Application of International Application No. PCT/CN2017/095410, filed on Aug. 1, 2018, and claims benefit of the Chinese Patent Application No. 201710035757.8, filed Jan. 18, 2017, each of which is incorporated herein by reference in its entirety.

TECHNICAL FIELD

The present disclosure relates to the technical field of liquid crystal display, and in particular, to a display device and a display method.

BACKGROUND

At present, liquid crystal display devices have been widely used in people's lives.

In the conventional liquid crystal display device, the liquid crystal is used to modulate polarization of a linearly polarized light to change the polarization orientation of the linearly polarized light, so as to display pictures in different states, that is, grey scale display. Thus, in the conventional liquid crystal display device, polarizer sheets need to be provided on two substrates of the display panel. Unless the two polarizer sheets cooperate with each other, the liquid crystal display device cannot display pictures in different states.

SUMMARY

An embodiment of the present disclosure provides a display device, including: a display panel including a first substrate, a second substrate and a liquid crystal prism arranged between the first substrate and the second substrate; and a backlight source configured to emit a light which is incident onto the second substrate at an oblique angle; wherein the liquid crystal prism is configured to adjust a deflection angle of the light emitted from the backlight source traveling between the first substrate and the second substrate such that the light emitted from the backlight source is totally-reflected at a light exit face of the display device or exits from the light exit face of the display device.

In some embodiments, the liquid crystal prism is configured to have a first operation state in which the light emitted by the backlight source is entirely incident onto the light exit face of the display device at an incident angle greater than or equal to a total reflection critical angle after it has been deflected by the liquid crystal prism and a second operation state in which the light emitted by the backlight source is entirely incident onto the light exit face of the display device at an incident angle less than the total reflection critical angle after it has been deflected by the liquid crystal prism.

In some embodiments, the liquid crystal prism is further configured to have a third operation state in which one part of the light emitted by the backlight source is incident onto the light exit face of the display device at an incident angle greater than or equal to the total reflection critical angle after it has been deflected by the liquid crystal prism while the other part of the light emitted by the backlight source is incident onto the light exit face of the display device at an incident angle less than the total reflection critical angle after it has been deflected by the liquid crystal prism.

In some embodiments, the backlight source is arranged to face towards a surface of the second substrate away from the first substrate.

In some embodiments, the liquid crystal prism includes a liquid crystal layer, and a first electrode and a second electrode insulated from each other.

In some embodiments, the first electrode and the second electrode are arranged on two opposite sides of the liquid crystal layer respectively.

In some embodiments, the first electrode is a planar electrode and the second electrode includes a plurality of strip electrodes.

In some embodiments, each of the plurality of strip electrodes has a width of 2.5 µm in a direction parallel to a surface of the second substrate and a strip electrode gap of 3.5 µm is provided between two adjacent strip electrodes; and the liquid crystal layer has a thickness less than 10 µm.

In some embodiments, the light emitted by the backlight source is linearly polarized.

In some embodiments, the light emitted by the backlight source is a natural light and the display device further includes a polarizer sheet arranged between the second substrate and the backlight source.

In some embodiments, a frosted film is arranged on a surface of the first substrate away from the second substrate.

In some embodiments, the display panel further includes a black matrix arranged on a surface of the second substrate facing towards the liquid crystal prism and the black matrix is configured to limit a light incidence region on the second substrate for the light emitted by the backlight source.

In some embodiments, a planarization layer is arranged between the second substrate and the liquid crystal prism, the planarization layer covering the black matrix which is arranged between the planarization layer and the second substrate.

In some embodiments, the display panel further includes a black matrix arranged on a surface of the second substrate away from the liquid crystal prism.

In some embodiments, the first substrate in the display device has a greater refractive index than external environmental medium in contact with the display device.

In some embodiments, the light emitted by the backlight source has an incidence angle in a range from 55 degrees to 60 degrees when the light is incident onto the second substrate.

An embodiment of the present disclosure discloses a display method using the display device as described in any one of the above embodiments, the display method including: directing the light emitted from the backlight source to be incident onto the second substrate at an oblique angle; controlling the liquid crystal prism to regulate the deflection angle of the light emitted by the backlight source traveling between the first substrate and the second substrate, such that the light emitted by the backlight source is totally-reflected at the light exit face of the display device or exits from the light exit face of the display device.

In some embodiments, the liquid crystal prism includes a liquid crystal layer, a first electrode and a second electrode, and controlling the liquid crystal prism includes: controlling a common voltage applied to the first electrode and controlling a magnitude of a driving voltage applied to the second electrode to control a deflection state of liquid crystal in the liquid crystal layer.

In some embodiments, the display method further includes: applying a driving voltage $V_1$ to the second electrode to make the light emitted by the backlight source entirely exit from the light exit face of the display device; or applying a driving voltage $V_2$ to the second electrode to make the light emitted by the backlight source be entirely totally-reflected at the light exit face of the display device; or applying a driving voltage $V_3$ greater than $V_1$ but less than $V_2$ to the second electrode to make one part of the light emitted by the backlight source be totally-reflected at the light exit face of the display device and make the other part of the light emitted by the backlight source exit from the light exit face of the display device.

In some embodiments, the light emitted by the backlight source has an incidence angle in a range from 55 degrees to 60 degrees when the light is incident onto the second substrate.

BRIEF DESCRIPTION OF THE DRAWINGS

In order to explain the technical solutions of embodiments of the present disclosure or those in the prior art more explicitly, figures required for describing the embodiments or the prior art will below be described briefly. Apparently, the following figures are only intended to show some of embodiments of the present disclosure. The skilled person in the art may also obtain other figures from those without any creative efforts.

DETAILED DESCRIPTION OF PREFERRED EMBODIMENTS OF THE DISCLOSURE

In order that the above objects, features and advantages of the present disclosure can become more apparent, technical solutions in the embodiments of the present disclosure will below be explained clearly and entirely. Apparently, the described embodiments are only some of embodiments in the present disclosure, instead of all of embodiments. From the embodiments of the present disclosure, all of other embodiments derived by the skilled person in the art without any creative efforts fall within the scope of the present disclosure.

In accordance with a general concept, an embodiment of the present disclosure provides a display device, including: a display panel including a first substrate, a second substrate and a liquid crystal prism arranged between the first substrate and the second substrate; and a backlight source configured to emit a light which is incident onto the second substrate at an oblique angle; wherein the liquid crystal prism is configured to adjust a deflection angle of the light emitted from the backlight source traveling between the first substrate and the second substrate such that the light emitted from the backlight source is totally-reflected at a light exit face of the display device or exits from the light exit face of the display device.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
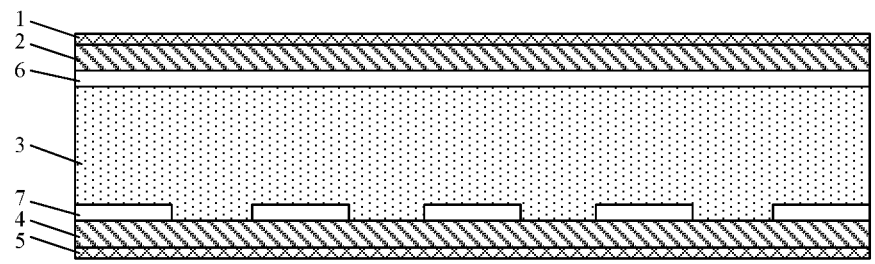
FIG. 1 is a schematic view showing an exemplified structure of a liquid crystal display device.

As illustrated in FIG. 1, an exemplified liquid crystal display in turn includes a first polarizer sheet 1, a first substrate 2, a liquid crystal layer 3, a second substrate 4 and a second polarizer sheet 5. A common electrode 6 is arranged on a surface of the first substrate 2 facing towards the second substrate 4. A pixel electrode 7 is arranged on a surface of the second substrate 4 facing towards the first substrate 2. The first substrate 2, the liquid crystal layer 3, the second substrate 4, the common electrode 6 and the pixel electrode 7 constitute a display panel.

When a natural light is incident on a surface of the second substrate 4 away from the first substrate 2, the second polarizer sheet 5 arranged to face towards the second substrate 4 at first needs to convert the natural light into a linearly polarized light. A driving voltage is applied to the pixel electrode 7 and a common voltage is supplied to the common electrode 6. In this way, an electrical field is formed between the pixel electrode 7 and the common electrode 6 to drive liquid crystal in the liquid crystal layer to deflect, so as to change the polarization of the linear polarized light traveling in the liquid crystal layer 3. When the polarization orientation of the linearly polarized light is parallel to a polarization axis of the first polarizer sheet 1, the linearly polarized light may exit from the first substrate 2 and the first polarizer sheet 1. In contrast, when the polarization orientation of the linearly polarized light is perpendicular to the polarization axis of the first polarizer sheet 1, the linearly polarized light cannot exit from the first substrate 2 and the first polarizer sheet 1. In the exemplified liquid crystal display device, the polarizer sheets at two substrates of the display panel are necessary. Unless the two polarizer sheets cooperate with each other, the liquid crystal display device cannot display pictures in different states.

Figure 2:
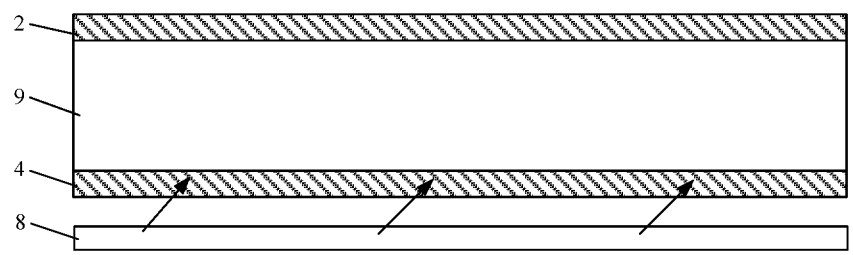
FIG. 2 is a first structural schematic view showing a display device provided by an embodiment of the present disclosure.

As shown in FIG. 2, an embodiment of the present disclosure provides a display device, which includes a display panel and a backlight source 8. The display panel includes a first substrate 2, a second substrate 4 and a liquid crystal prism 9 arranged between the first substrate 2 and the second substrate 4. The backlight source 8 is configured to emit a light which is incident onto the second substrate 4 at an oblique angle. As an example, the backlight source 8 may be arranged to face towards a surface of the second substrate 4 away from the first substrate 2. However, the embodiments of the present disclosure are not limited to this. The backlight source 8 may also be arranged in other orientations, as long as the light emitted by it can be incident onto the second substrate 4 at an oblique angle.

The liquid crystal prism 9 is configured to adjust a deflection angle of the light emitted from the backlight source 8 traveling between the first substrate 2 and the second substrate 4 such that the light emitted from the backlight source 8 is totally-reflected at a light exit face of the display device or exits from the light exit face of the display device. The light exit face of the display device is an interface between the first substrate 2 and the external environmental medium in contact with the display device. As an example, the light exit face of the display device is a surface of the first substrate 2 away from the second substrate 4.

In view of the above structure, the liquid crystal prism 9 may be used to control the deflection angle of the light emitted from the backlight source 8 traveling between the first substrate 2 and the second substrate 4, so as to control magnitude of the incidence angle when the light travels to the light exit face of the display device. When the light entirely violates the total reflection condition at the light exit face, the light entirely exits from the light exit face. At that time, the display device exhibits a bright display state. When the light entirely satisfies the total reflection condition at the light exit face, the light entirely is totally reflected at the light exit face and is reflected back to the liquid crystal prism. At that time, the display device exhibits a dark display state. When one part of the light satisfies the total reflection condition at the light exit face, such part of the light can be totally-reflected at the light exit face and the other part of the light can exit from the light exit face. At that time, the display device exhibits a gray scale display state between the bright display state and the dark display state. Thus, with the display device provided by the present disclosure, by means of deflection principle of the liquid crystal prism to the light and the total reflection condition at the light exit face of the display device, the display device may also exhibit different display states without using two polarizer sheets.

In particular, when the light emitted by the backlight source 8 travels to the interface entirely at an incidence angle less than a total reflection critical angle, i.e., the light entirely violates the total reflection condition, the light exits from the interface. At that time, the display panel has maximum light transmission and the display device exhibits the bright display state. When the light emitted by the backlight source 8 travels to the interface entirely at an incidence angle greater than or equal to the total reflection critical angle, i.e., the light entirely satisfies the total reflection condition, the light is entirely totally-reflected at the interface and is reflected back to the liquid crystal prism 9. At that time, the light transmission of the display panel becomes zero and the display device exhibits the dark display state. When the light emitted by the backlight source 8 travels to the interface with only part of the light having the incidence angle greater than or equal to the total reflection critical angle, this part of the light may be totally-reflected, back to the liquid crystal prism 9, at the interface. The incidence angle of the other part of the light is less than the total reflection critical angle, and this part of the light may exit from the interface. At that time, the display device exhibits a gray scale display state between the bright display state and the dark display state.

In an example, the liquid crystal prism 9 may be configured to have a first operation state and a second operation state. In the first operation state, the light emitted by the backlight source 8 is entirely incident onto the light exit face of the display device at an incident angle greater than or equal to a total reflection critical angle after it has been deflected by the liquid crystal prism 9. In the second operation state, the light emitted by the backlight source 8 is entirely incident onto the light exit face of the display device at an incident angle less than the total reflection critical angle after it has been deflected by the liquid crystal prism 9. When the liquid crystal prism 9 is in the first operation state, the display device exhibits the dark display state. In contrast, when the liquid crystal prism 9 is in the second operation state, the display device exhibits the bright display state.

As an example, the liquid crystal prism 9 may further be configured to have a third operation state. In the third operation state, one part of the light emitted by the backlight source 8 is incident onto the light exit face of the display device at an incident angle greater than or equal to the total reflection critical angle after it has been deflected by the liquid crystal prism 9 while the other part of the light emitted by the backlight source 8 is incident onto the light exit face of the display device at an incident angle less than the total reflection critical angle after it has been deflected by the liquid crystal prism 9. When the liquid crystal prism 9 is in the third operation state, the display device exhibits the grey scale display state between the bright display state and the dark display state.

Thus, by means of the display device provided by the embodiments, using the deflection principle of the liquid crystal prism 9 to the light in combination with the total reflection condition at the interface between the first substrate 2 and the external environmental medium, even if no corresponding polarizer sheets are arranged at the first substrate 2, the display device may also exhibit different display states.

As an example, the light emitted by the backlight source 8 may be a natural light, or may be a linearly polarized light with single polarization orientation.

Figure 3:
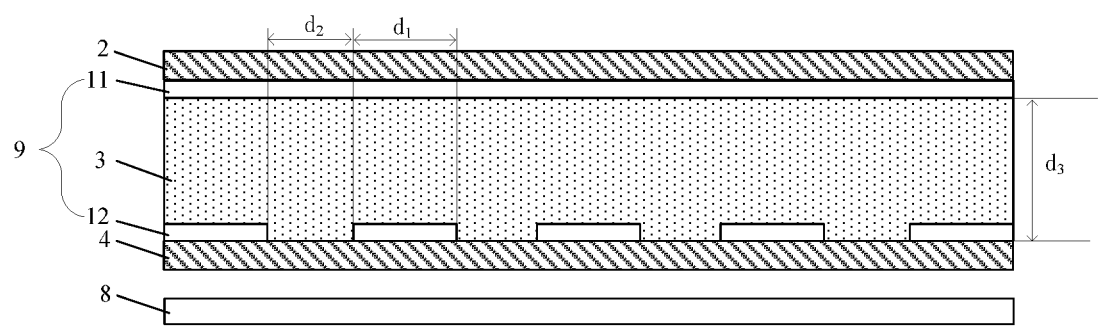
FIG. 3 is a second structural schematic view showing a display device provided by an embodiment of the present disclosure.

As illustrated in FIG. 3, as an example, the liquid crystal prism 9 in the display panel may include a liquid crystal layer 3, and a first electrode 11 and a second electrode 12 insulated from each other.

As an example, the first electrode 11 and the second electrode 12 may both be arranged at one side of the liquid crystal layer 3 facing towards the first substrate 2; or the first electrode 11 and the second electrode 12 may both be arranged at one side of the liquid crystal layer 3 facing towards the second substrate 4; or, the first electrode 11 and the second electrode 12 may be arranged on two opposite sides of the liquid crystal layer 3 respectively.

When the first electrode 11 and the second electrode 12 are arranged on the same side of the liquid crystal layer 3, the first electrode 11 and the second electrode 12 may be arranged in the same layer or in different layers respectively.

The first electrode 11 may for example be a common electrode. The second electrode 12 may for example be a pixel electrode.

In an example, in accordance with the specific structure of the liquid crystal prism 9, when a driving voltage is applied to the second electrode 12 and a common voltage is applied to the first electrode 11, an electrical field may be generated between the second electrode 12 and the first electrode 11, so as to drive the liquid crystal in the liquid crystal layer 3 to deflect. The deflected liquid crystal can cause the light traveling in the liquid crystal layer 3 to deflect, so as to change the incidence angle of the light on the interface between the first substrate 2 and the external environmental medium. In this way, the driving voltage applied to the second electrode 12 may be varied to change the deflection states of the liquid crystal, so as to change the deflection angle of the light traveling in the liquid crystal layer 3 to regulate the incidence angle of the light on the interface to be greater than, equal to or less than the total reflection critical angle.

In an example, the first electrode 11 is a planar electrode and the second electrode 12 includes a plurality of strip electrodes.

As an example, each of the strip electrodes has a width $d_1$ of 2.5 μm in a direction parallel to a surface of the second substrate 4 and a strip electrode gap $d_2$ of 3.5 μm is provided between two adjacent strip electrodes; and the liquid crystal layer 3 in the liquid crystal prism 9 has a thickness $d_3$ less than 10 μm.

The deflection state of the whole liquid crystal in the liquid crystal layer 3 may be equivalent to a liquid crystal deflection equivalent interface. By reasonably designing the width $d_1$ of each of the strip electrodes, the strip electrode gap $d_2$ and the thickness $d_3$ of the liquid crystal layer 3, the liquid crystal deflection equivalent interface may be optimized, to further control the deflection angle of the linearly polarized light better.

It should be noted that the above given specific numerical values of $d_1$, $d_2$ and $d_3$ are only optional numerical values, instead of limiting their respective practical numerical values. From the display principle corresponding to the display device in the embodiment, as long as the reasonable numerical values are designed for them, the display device can exhibit different display states.

It should be noted that the first substrate 2 in the display device should have a greater refractive index than the external environmental medium. If the first substrate 2 and the second substrate 4 are both glass substrates and the light exit face of the display device is an interface between the first substrate 2 and the air, the refractive index of the first substrate 2 should be greater than the refractive index of the air. For example, if the refractive index of the air is 1.0, the refractive index of the first substrate 2 may be 1.5.

As an example, the light emitted by the backlight source 8 is incident onto the second substrate 4 at an oblique incidence angle in a range from 55 degrees to 60 degrees.

Figure 4:
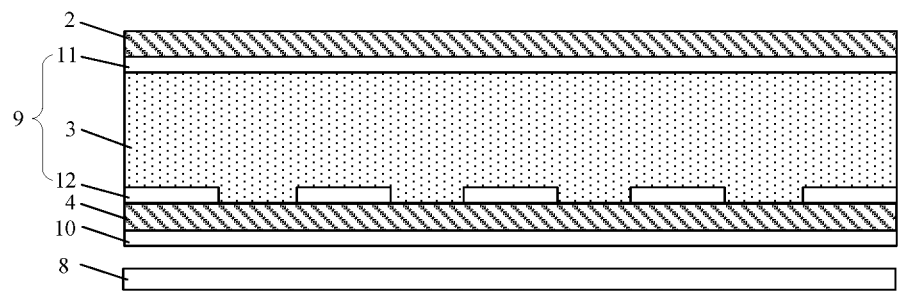
FIG. 4 is a third structural schematic view showing a display device provided by an embodiment of the present disclosure.

As shown in FIG. 4, as an example, since the light traveling in the liquid crystal prism 9 is desired to be a linearly polarized light, a polarizer sheet 10 for converting the natural light into the linearly polarized light needs to be arranged between the second substrate 4 and the backlight source 8 when the light emitted by the backlight source 8 is the natural light.

As an example, the polarizer sheet 10 may be also replaced by a polarizer layer. The polarizer layer may in particular be arranged on the side of the second substrate 4 facing towards the backlight source 8, or may be arranged on the side of the second substrate 4 away from the backlight source 8. The polarizer layer may for example be a wire grid structure.

It should be understood that, when the light emitted by the backlight source 8 is a linearly polarized light with single polarization orientation, the polarizer sheet 10 arranged between the second substrate 4 and the backlight source 8 is not necessary and the linearly polarized light emitted by the backlight source 8 may be directly incident onto the second substrate 4.

Figure 5:
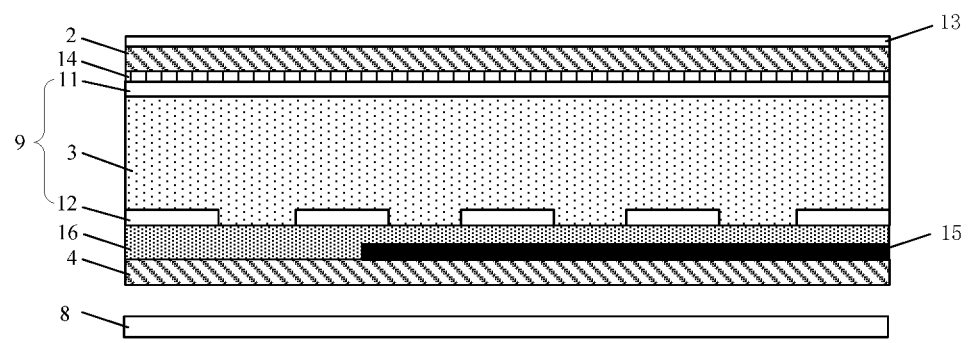
FIG. 5 is a fourth structural schematic view showing a display device provided by an embodiment of the present disclosure.

As shown in FIG. 5, as an example, a frosted film 13 may also be arranged on a surface of the first substrate 2 away from the second substrate 4. The frosted film 13 is configured to disperse a collimated light emitted from the first substrate 2, to enhance a visual angle of the picture displayed by the display device.

In an example, the frosted film 13 may be adhered to a surface of the first substrate 2, for example, only a periphery of the frosted film 13 is adhered to the surface of the first substrate 2, and the intermediate region of the frosted film 13 and the intermediate region of the first substrate 2 are separated by an air layer therebetween. In this case, it is not intended to limit the refractive index of the frosted film 13.

In another example, the frosted film 13 may also be fully adhered to the surface of the first substrate 2. In this case, the refractive index of the frosted film 13 is desired to be close to the refractive index of the air as much as possible, such that the refractive index of the first substrate 2 of the display device is greater than the refractive index of the frosted film 13, to ensure that the light may be totally-reflected at the surface of the first substrate 2.

As an example, a color filter layer 14 for filtering light may also be arranged between the first substrate 2 and the liquid crystal prism 9. The color filter layer 14 may make different sub-pixels to exhibit different colors respectively.

Typically, in the conventional display panel, the black matrix is only arranged at the first substrate 2. The black matrix at this position is intended to block and absorb the external incident light and to avoid color mixing of adjacent pixels, so as to prevent the external light from irradiating TFT devices on the second substrate 4 directly or indirectly by reflection or scattering and thereby prevent degrading off state characteristics of the TFT devices.

In the display device provided by the embodiment, as an example, the black matrix 15 may also be arranged at the second substrate 4. The black matrix 15 at this position is arranged to correspond to an opening region of the pixel, to limit a light incidence region for the light emitted by the backlight source 8, to further limit the light exit region of the light at the interface between the first substrate 2 and the external environmental medium, to prevent the exit light from entering the adjacent sub-pixels so as to avoid cross color. When the light emitted by the backlight source 8 is totally-reflected at the interface between the first substrate 2 and the external environmental medium, the black matrix 15 may also absorb the light reflected into the liquid crystal prism 9 to prevent the light from being reflected again.

As an example, the black matrix 15 may be arrange at the surface of the second substrate 4 facing towards the liquid crystal prism 9 and may also be arranged at the surface of the second substrate 4 away from the liquid crystal prism 9.

When the black matrix 15 is arranged at the surface of the second substrate 4 facing towards the liquid crystal prism 9, as the black matrix 15 has an uneven surface, a planarization layer 16 which is smooth and covers the black matrix 15 may also be arranged between the second substrate 4 and the liquid crystal prism 9, so as to achieve better contact with the second electrode 12. The black matrix 15 may be arranged between the planarization layer 16 and the second substrate 4.

It should be understood that, when the backlight source 8 in the display device is a strip backlight source 8, the black matrix 15 at the second substrate 4 will not be necessary as the strip backlight source 8 may be limited by its own light emitting region.

Based on the above specific structure of the display device, in order to explain the process for propagating the corresponding linearly polarized light in the bright display state, the dark display state and the gray scale display state between the bright display state and the dark display state more explicitly, the embodiments of the present disclosure will be described below with reference to FIG. 6 to FIG. 8.

Figure 6:
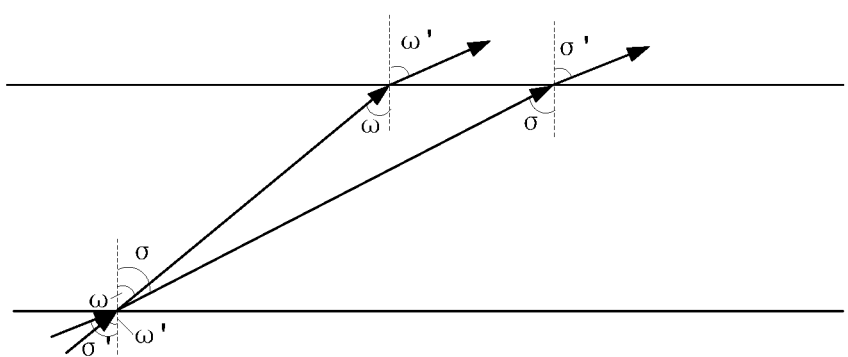
FIG. 6 is a first schematic view showing a linearly polarized light traveling in a display device provided by an embodiment of the present disclosure.
Figure 7:
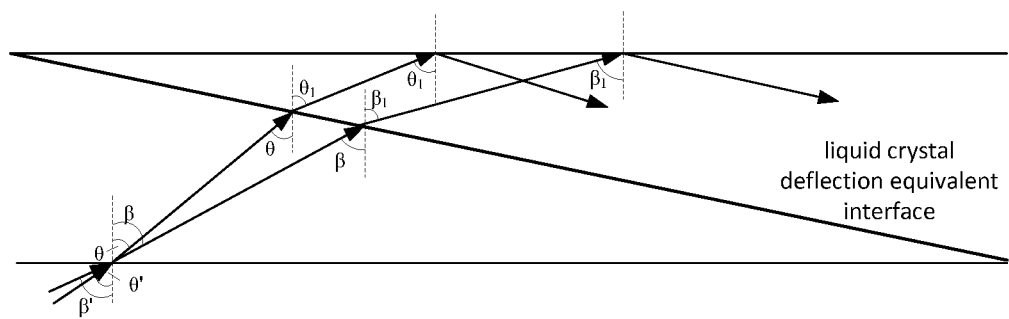
FIG. 7 is a second schematic view showing a linearly polarized light traveling in a display device provided by an embodiment of the present disclosure.
Figure 8:
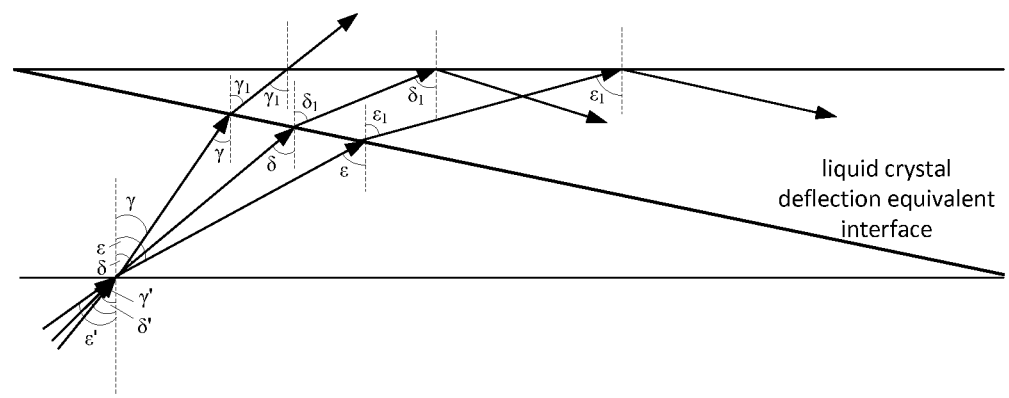
FIG. 8 is a third schematic view showing a linearly polarized light traveling in a display device provided by an embodiment of the present disclosure.

It should be noted that, in FIG. 6 to FIG. 8, the upper straight line represents the interface between the first substrate 2 and the external environmental medium and the lower straight line represents the surface of the second substrate 4 away from the first substrate 2.

When the display device exhibits the bright display state, as shown in FIG. 6, taking two incident linearly polarized lights as an example, ω' is an incidence angle at which a first linearly polarized light is incident onto the second substrate 4; σ' is an incidence angle at which a second linearly polarized light is incident onto the second substrate 4; and ω'<σ'. In process for practical light propagation, when the light is incident onto the second substrate 4 from the external environmental medium, it may be refracted at the incident surface of the second substrate 4. ω is an angle of the first linearly polarized light after it has been refracted at the surface of the second substrate 4. σ is an angle of the second linearly polarized light after it has been refracted at the surface of the second substrate 4.

When the driving voltage is not applied to the second electrode 12, the liquid crystal molecules in the liquid crystal layer 3 are not deflected. The first linearly polarized light and the second linearly polarized light both travel along a straight line in the liquid crystal layer 3 and exit from the interface between the first substrate 2 and the external environmental medium. At that time, the display panel has maximum light transmission and the display device exhibits the bright display state.

All of layers between the first substrate 2 and the second substrate 4 are parallel to each other, thus, the first linearly polarized light and the second linearly polarized light have the same exit angles from the first substrate 2 as the incidence angles of them onto the second substrate 4.

When the display device exhibits the dark display state, as shown in FIG. 7, taking two incident linearly polarized lights as an example, θ' is an incidence angle at which a third linearly polarized light is incident onto the second substrate 4; β' is an incidence angle at which a fourth linearly polarized light is incident onto the second substrate 4; and θ'<β'. In process for practical light propagation, when the light is incident onto the second substrate 4 from the external environmental medium, it may be refracted at the incident surface of the second substrate 4. θ is an angle of the third linearly polarized light after it has been refracted at the surface of the second substrate 4. β is an angle of the fourth linearly polarized light after it has been refracted at the surface of the second substrate 4. When the maximum driving voltage is applied to the second electrode 12, the liquid crystal molecules are deflected by a maximum deflection extent. The liquid crystal deflection equivalent interface is shown in FIG. 7.

Due to the effects of the deflected liquid crystal molecules, the third linearly polarized light and the fourth linearly polarized light are deflected at the liquid crystal deflection equivalent interface. After they are deflected, the angle at which the third linearly polarized light travels is increased to $θ_1$ from θ and the angle at which the fourth linearly polarized light travels is increased to $β_1$ from β.

Because the driving voltage applied to the second electrode 12 is sufficiently large, it can ensure the liquid crystal molecules to deflect to large extent, so as to ensure the third linearly polarized light and the fourth linearly polarized light to deflect by larger angle. For example, the third linearly polarized light and the fourth linearly polarized light may both be deflected by not less than 5 degrees. In this circumstance, the incident angle $θ_1$ of the deflected third linearly polarized light at the interface between the first substrate 2 and the external environmental medium is greater than the critical angle for the total reflection at the interface. Since β>θ, the incident angle $β_1$ of the deflected fourth linearly polarized light at the interface is also greater than the critical angle for the total reflection at the interface. In this circumstance, the deflected third linearly polarized light and the deflected fourth linearly polarized light are totally-reflected back to the liquid crystal layer 3 at the interface. At that time, the light transmission of the display panel becomes zero and the display device exhibits the dark display state.

When the display device exhibits the gray scale display state between the bright display state and the dark display state, as shown in FIG. 8, taking three incident linearly polarized lights as an example, γ' is an incidence angle at which a fifth linearly polarized light is incident onto the second substrate 4; δ' is an incidence angle at which a sixth linearly polarized light is incident onto the second substrate 4; ε' is an incidence angle at which a seventh linearly polarized light is incident onto the second substrate 4; and γ'<δ'<ε'. In process for practical light propagation, when the light is incident onto the second substrate 4 from the external environmental medium, it may be refracted at the incident surface of the second substrate 4. γ is an angle of the fifth linearly polarized light after it has been refracted at the surface of the second substrate 4. δ is an angle of the sixth linearly polarized light after it has been refracted at the surface of the second substrate 4. ε is an angle of the seventh linearly polarized light after it has been refracted at the surface of the second substrate 4.

When the driving voltage applied to the second electrode 12 is greater than zero but less than the maximum driving voltage, the liquid crystal molecules are deflected, but its deflection degree is less than that of the liquid crystal deflection state corresponding to the dark display state. The liquid crystal deflection equivalent interface is shown in FIG. 8.

Due to the effects of the deflected liquid crystal molecules, the fifth linearly polarized light, the sixth linearly polarized light and the seventh linearly polarized light are deflected at the liquid crystal deflection equivalent interface. After they are deflected, the angle at which the fifth linearly polarized light travels is increased to $γ_1$ from γ, the angle at which the sixth linearly polarized light travels is increased to $δ_1$ from δ, and the angle at which the seventh linearly polarized light travels is increased to $ε_1$ from ε.

However, because the deflection degree is less than that of the liquid crystal deflection state corresponding to the dark display state, it cannot ensure all of the linearly polarized lights can be entirely totally-reflected. In this circumstance, the incident angle $γ_1$ of the deflected fifth linearly polarized light at the interface between the first substrate 2 and the external environmental medium is less than the critical angle for the total reflection at the interface. Thus, the fifth linearly polarized light violates the total reflection condition, and thus may exit from the interface. The incident angle $δ_1$ of the deflected sixth linearly polarized light and the incident angle $ε_1$ of the deflected seventh linearly polarized light at the interface are both greater than the critical angle for the total reflection at the interface. In this circumstance, the deflected sixth linearly polarized light and the deflected seventh linearly polarized light are totally-reflected back to the liquid crystal layer 3 at the interface. At that time, the display device exhibits the gray scale display state between the bright display state and the dark display state.

It is assumed that the fifth linearly polarized light has a light intensity of x, the sixth linearly polarized light has a light intensity of y, and the seventh linearly polarized light has a light intensity of z. When a certain driving voltage is applied to the second electrode 12, due to the effects of the driving voltage, the fifth linearly polarized light exits from the first substrate 2 and the sixth linearly polarized light and the seventh linearly polarized light are reflected back to the liquid crystal layer 3. At that time, the exit linearly polarized lights have total light intensity of x. If the driving voltage is increased such that the fifth linearly polarized light and the sixth linearly polarized light exit from the first substrate 2 and the seven linearly polarized light is reflected back to the liquid crystal layer 3, the exit linearly polarized lights have total light intensity of x+y, that is, the display device may achieve different levels of the gray scale display.

An embodiment of the present disclosure also provides a display method using the display device. The display method for the display device is applied to the display device as described in the above embodiment.

The display method in particular includes: directing the light emitted by the backlight source (for example with angles of divergence) incident onto the second substrate at an oblique angle, controlling the liquid crystal prism to regulate the deflection angle of the light emitted by the backlight source traveling between the first substrate and the second substrate, such that the light emitted by the backlight source is totally-reflected at the light exit face of the display device or exits from the light exit face of the display device. The light exit face of the display device is the interface between the first substrate and the external environmental medium in contact with the display device. As an example, the light exit face of the display device is the surface of the first substrate away from the second substrate.

In an example, the light emitted by the backlight source (for example with angles of divergence) is incident onto the second substrate at an oblique angle, and the liquid crystal prism is controlled such that the light travels along a straight line between the first substrate and the second substrate and any of the light is not totally-reflected at the interface between the first substrate and the external environment and thus the light entirely exits from the interface. In this circumstance, the display device exhibits the bright display state.

In another example, the light emitted by the backlight source (for example with angles of divergence) is incident onto the second substrate at an oblique angle, and the liquid crystal prism is controlled such that the light is deflected by the maximum deflection angle when it travels between the first substrate and the second substrate. In this way, the incidence angle of the deflected light at the interface is greater than or equal to the critical angle for the total reflection at the interface, and thus the light is entirely totally-reflected back to the liquid crystal layer at the interface. In this circumstance, the display device exhibits the dark display state.

In a further example, the light emitted by the backlight source (for example with angles of divergence) is incident onto the second substrate at an oblique angle, and the liquid crystal prism is controlled such that the light is deflected by a deflection angle less than the maximum deflection angle when it travels between the first substrate and the second substrate. In this way, the incidence angle of one part of the deflected light at the interface is greater than or equal to the critical angle for the total reflection at the interface, and thus the part of the light is entirely totally-reflected back to the liquid crystal layer at the interface; the incidence angle of the other part of the deflected light is less than the critical angle for the total reflection at the interface, and thus the other part of the deflected light exits from the interface instead of being totally-reflected at the interface. In this circumstance, the display device exhibits the gray scale display state between the bright display state and the dark display state.

With the display method for the display device provided by the present embodiments, by means of controlling the deflection angle of the light emitted by the backlight source traveling between the first substrate and the second substrate by the liquid crystal prism, the magnitude of the incidence angle of the light at the interface between the first substrate and the external environmental medium may be regulated. Considering the total reflection condition at the interface between the first substrate and the external environmental medium, the display device may also exhibit different display states without using two polarizer sheets.

Again referring to FIG. 3, when the liquid crystal prism 9 includes the liquid crystal layer 3, the first electrode 11 and the second electrode 12, in particular, controlling the liquid crystal prism 9 such that the light travels along a straight line between the first substrate 2 and the second substrate 4 may specifically include: keeping the initial state of the liquid crystal in the liquid crystal layer 3 instead of applying the driving voltage to the second electrode 12 and applying the common voltage to the first voltage 11, so as to make the light travel in the liquid crystal layer 3 along a straight line.

Again referring to FIG. 6, when the driving voltage is not applied to the second electrode 12, the liquid crystal in the liquid crystal layer 3 will not be deflected. In this way, when the linearly polarized light with angles of divergence is incident onto the second substrate at an oblique angle, the light is kept to travel along the straight line in the liquid crystal layer 3 and exits from the interface between the first substrate 2 and the external environment such that the display device is in the bright display state.

In particular, controlling the liquid crystal prism 9 such that the light is deflected by the maximum deflection angle when it travels between the first substrate 2 and the second substrate 4 may include: applying the maximum driving voltage to the second electrode 12 and applying the common voltage to the first electrode 11 to deflect the liquid crystal such that the light is deflected by the maximum deflection angle in the liquid crystal layer.

Again referring to FIG. 7, the maximum driving voltage is applied to the second electrode 12 such that the liquid crystal is deflected by a relatively large deflection degree. In this way, when the linearly polarized light with angles of divergence is incident onto the second substrate 4 at an oblique angle, due to the effects of the deflected liquid crystal, the linearly polarized light is deflected in the liquid crystal layer 3 and the incidence angle of the deflected linearly polarized light at the interface is greater than or equal to the critical angle for the total reflection at the interface and thus the linearly polarized light is entirely totally-reflected back to the liquid crystal layer 3 at the interface. In this circumstance, the display device is in the dark display state.

In particular, controlling the liquid crystal prism 9 such that the light is deflected by a deflection angle less than the maximum deflection angle when it travels between the first substrate 2 and the second substrate 4 may include: applying a driving voltage greater than zero but less than the maximum driving voltage to the second electrode 12 and applying the common voltage to the first electrode 11 to deflect the liquid crystal such that the light is deflected by the deflection angle less than the maximum deflection angle in the liquid crystal layer 3.

Again referring to FIG. 8, the driving voltage greater than zero but less than the maximum driving voltage is applied to the second electrode 12 such that the liquid crystal is deflected. In this way, when the linearly polarized light with angles of divergence is incident onto the surface of the second substrate 4 away from the first substrate 2, due to the effects of the deflected liquid crystal, the linearly polarized light is deflected in the liquid crystal layer 3. However, since the applied driving voltage is less than the maximum driving voltage, the deflection angle of the linearly polarized light is less than the deflection angle corresponding to the maximum driving voltage. In this way, one part of the linearly polarized light with relatively large incidence angle, after being deflected, has the incidence angle at the interface greater than or equal to the critical angle and thus is totally-reflected back to the liquid crystal layer 3 at the interface, and the other part of the linearly polarized light with relatively small incidence angle, after being deflected, has the incidence angle at the interface less than the critical angle and thus exits from the interface. In this way, one part of the linearly polarized light exits from the first substrate 2 while the other part of the linearly polarized light is reflected back to the liquid crystal layer 3, such that the display device exhibits the gray scale display state between the bright display state and the dark display state.

In an example, if it is desired to make the display device to exhibit the bright display state, it may apply a driving voltage $V_1$ (for example, $V_1=0V$) to the second electrode 12, correspondingly, the linearly polarized light has the deflection angle $\kappa_1=0°$.

If it is desired to make the display device to exhibit the dark display state, it may apply a maximum driving voltage $V_2$ (for example, $V_2=10V$) to the second electrode 12, correspondingly, the linearly polarized light has the maximum deflection angle $\kappa_2=5°$.

If it is desired to make the display device to exhibit the gray scale display state between the bright display state and the dark display state and ensure one part of the linearly polarized light to exit from the first substrate 2 and the other part of the linearly polarized light to be reflected back to the liquid crystal layer 3, the driving voltage $V_3$ applied to the second electrode 12 needs to satisfy: $0V<V_3<V_2$, correspondingly, the linearly polarized light has the deflection angle $\kappa_3<5°$.

As an example, the linearly polarized light has an incidence angle in a range from 55 degrees to 60 degrees when the light is incident onto the surface of the second substrate 4 away from the first substrate 2.

In addition, when the display device further includes the polarizer sheet arranged between the second substrate and the backlight source, before the light emitted by the backlight source enters the second substrate, the method further includes: converting the light into the linearly polarized light.

Only some exemplified embodiments of the present disclosure are explained in the above description. However, the scope of the present disclosure is not limited to those. Any variants or alternations that the skilled person in the art can easily envisage within the technical range of the present disclosure should fall within the scope of the present disclosure. Therefore, the scope of the present disclosure should be defined by the scope of the appended claims.

What is claimed is:

1. A display device, comprising:
a display panel comprising a first substrate, a second substrate and a liquid crystal prism arranged between the first substrate and the second substrate; and
a backlight source configured to emit a light which is incident onto the second substrate at an oblique angle;
wherein the liquid crystal prism is configured to adjust a deflection angle of the light emitted from the backlight source traveling between the first substrate and the second substrate such that the light emitted from the backlight source is totally-reflected at a light exit face of the display device or exits from the light exit face of the display device,
wherein the liquid crystal prism is configured to have a first operation state in which the light emitted by the backlight source is entirely incident onto the light exit face of the display device at an incident angle greater than or equal to a total reflection critical angle after it has been deflected by the liquid crystal prism and a second operation state in which the light emitted by the backlight source is entirely incident onto the light exit face of the display device at an incident angle less than the total reflection critical angle after it has been deflected by the liquid crystal prism,
wherein the display panel further comprises a black matrix arranged on a surface of the second substrate facing towards the liquid crystal prism and the black matrix is configured to limit a light incidence region on the second substrate for the light emitted by the backlight source,
wherein the light emitted by the backlight source has an incidence angle in a range from 55 degrees to 60 degrees when the light is incident onto the second substrate,
wherein the backlight source is arranged to face towards a surface of the second substrate away from the first substrate,
wherein the liquid crystal prism comprises a liquid crystal layer, and a first electrode and a second electrode insulated from each other, and
wherein no polarizer is provided on a side of the liquid crystal layer opposite to the second substrate.

2. The display device according to claim 1, wherein the liquid crystal prism is further configured to have a third operation state in which one part of the light emitted by the backlight source is incident onto the light exit face of the display device at an incident angle greater than or equal to the total reflection critical angle after it has been deflected by the liquid crystal prism while the other part of the light emitted by the backlight source is incident onto the light exit face of the display device at an incident angle less than the total reflection critical angle after it has been deflected by the liquid crystal prism.

3. The display device according to claim 1, wherein the first electrode and the second electrode are arranged on two opposite sides of the liquid crystal layer respectively.

4. The display device according to claim 1, wherein the first electrode is a planar electrode and the second electrode comprises a plurality of strip electrodes.

5. The display device according to claim 4, wherein each of the plurality of strip electrodes has a width of 2.5 μm in a direction parallel to a surface of the second substrate and a strip electrode gap of 3.5 μm is provided between two adjacent strip electrodes; and the liquid crystal layer has a thickness less than 10 μm.

6. The display device according to claim 1, wherein the light emitted by the backlight source is linearly polarized.

7. The display device according to claim 1, wherein the light emitted by the backlight source is a natural light and the display device further comprises a polarizer sheet arranged between the second substrate and the backlight source.

8. The display device according to claim 1, wherein a frosted film is arranged on a surface of the first substrate away from the second substrate.

9. The display device according to claim 1, wherein a planarization layer is arranged between the second substrate and the liquid crystal prism, the planarization layer covering the black matrix which is arranged between the planarization layer and the second substrate.

10. The display device according to claim 1, wherein the first substrate in the display device has a greater refractive index than external environmental medium in contact with the display device.

11. A display method using the display device according to claim 1, the display method comprising:
    directing the light emitted from the backlight source to be incident onto the second substrate at an oblique angle;
    controlling the liquid crystal prism to regulate the deflection angle of the light emitted by the backlight source traveling between the first substrate and the second substrate, such that the light emitted by the backlight source is totally-reflected at the light exit face of the display device or exits from the light exit face of the display device.

12. The display method according to claim 11, wherein the liquid crystal prism comprises a liquid crystal layer, a first electrode and a second electrode, and controlling the liquid crystal prism comprises: controlling a common voltage applied to the first electrode and controlling a magnitude of a driving voltage applied to the second electrode to control a deflection state of liquid crystal in the liquid crystal layer.

13. The display method according to claim 12, further comprising:
    applying a driving voltage $V_1$ to the second electrode to make the light emitted by the backlight source entirely exit from the light exit face of the display device; or
    applying a driving voltage $V_2$ to the second electrode to make the light emitted by the backlight source be entirely totally-reflected at the light exit face of the display device; or
    applying a driving voltage $V_3$ greater than $V_1$ but less than $V_2$ to the second electrode to make one part of the light emitted by the backlight source be totally-reflected at the light exit face of the display device and make the other part of the light emitted by the backlight source exit from the light exit face of the display device.

* * * * *